United States Patent

[11] 3,621,410

| [72] | Inventors | Algernon S. Badger;<br>Jerrell F. Moffitt, both of Houston, Tex. |
|---|---|---|
| [21] | Appl. No. | 857,088 |
| [22] | Filed | Sept. 11, 1969 |
| [45] | Patented | Nov. 16, 1971 |
| [73] | Assignee | Geo Space Corporation |

[54] BINARY AMPLIFIER GAIN CONTROL
6 Claims, 1 Drawing Fig.

[52] U.S. Cl. .................................................. 330/2, 330/129
[51] Int. Cl. ...................................................... H03g 3/22
[50] Field of Search ........................................ 330/2, 29, 86, 127, 128, 129, 149; 340/15.5 GC

[56] References Cited
UNITED STATES PATENTS

| 3,434,065 | 3/1969 | Chu et al. ...................... | 330/127 X |
| 3,525,948 | 8/1970 | Sherer et al. .................. | 330/86 X |

*Primary Examiner*—Roy Lake
*Assistant Examiner*—James B. Mullins
*Attorneys*—Michael P. Breston and Alfred B. Levine ABSTRACT: This invention relates to multichannel, seimic-data-acquisition systems and more particularly to such systems which include binary-gain-ranging amplifiers. The gain of the amplifier is allowed to range within prescribed limits. The actual grain of the amplifier is then compared with a preset early gain. The result of the comparison is displayed on a suitable monitor to alert the operator of the existence of noise or of abnormal conditions in the channel.

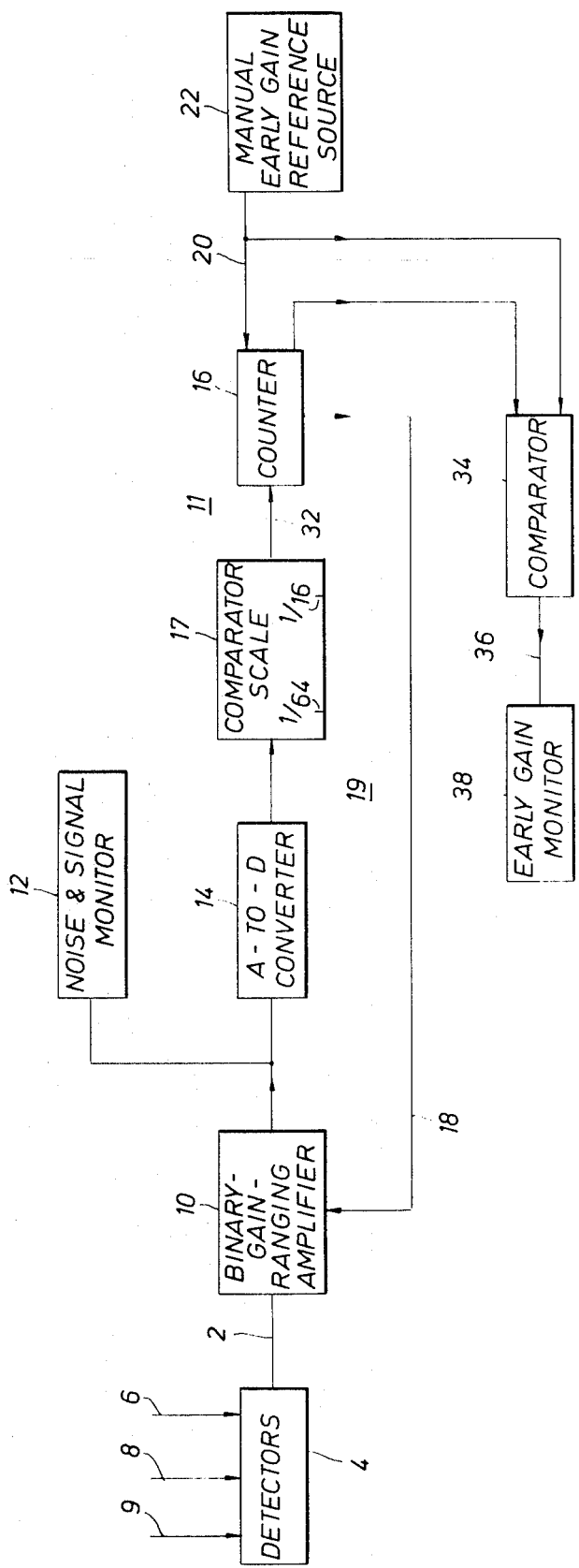

BINARY AMPLIFIER GAIN CONTROL

BACKGROUND OF THE INVENTION

Digital data-acquisition systems including a plurality of channels for receiving, processing and recording seismic signals provided by seismic detector stations, each employing a plurality of transducers such as geophones or hydrophones, are now widely employed in the seismic industry.

Each such channel includes a binary-gain-ranging amplifier. The operation of binary-gain-ranging amplifiers is well described in the technical and patent literature.

Prior to amplifying the seismic signals an "early gain" is present in the amplifier. This early gain is selected on the basis of normal noise which is expected to pass through the amplifier.

If the early gain were not preset, the amplifier would range up and the arriving seismic signal would saturate the amplifier, as is well known in the seismic art. If the early gain setting is too low, the initial incoming small-amplitude seismic signals may not be sufficiently amplified by the amplifier. On the other hand, if the early gain setting is too high, the initial large-amplitude seismic signals may become appreciably distorted.

The present practice is for the field operator to make an educated guess at the value of the early gain setting required, and to periodically ascertain whether such setting is appropriate. A wrong educated guess, or failure to monitor a channel prior to "shooting" the seismic energy source, may result in an unacceptable seismic record section.

There is therefore a great need to eliminate the guesswork from binary-range seismic amplifiers and the deleterious consequences of human error.

SUMMARY OF THE INVENTION

In a multichannel seismic-data-acquisition system, each binary-gain-ranging amplifier is provided with a gain loop which monitors the gain of the amplifier relative to a preset gain. The output of the amplifier is converted into digital data which is applied to a first comparator having comparison levels. The output digital data from the first comparator is applied to a counter to cause the counter to count up or down in dependence upon the output of the first comparator. The output of the counter is applied to the gain-setting network of the amplifier.

The output of the counter is also compared by a second comparator with an early gain set by the operator. The output of the second comparator is displayed on a monitor to alert the operator of noise or malfunction in the channel.

BRIEF DESCRIPTION OF THE DRAWING

In the drawing is shown, in block diagram form, a portion of a seismic binary-gain-ranging system embodying the present invention.

A seismic binary-gain-ranging amplifier 10 receives analog seismic signals on line 2 from a plurality of detectors or transducers 4, such as geophones or hydrophones. Detectors 4 receive incoming seismic acoustic waves represented by arrow 6 and transform these waves into corresponding electric signals of varying amplitude and frequency. Since the detectors are spread throughout a land or water field which is under seismic prospecting, they also detect environmental noise. The "normal" noise is indicated by arrow 8 and "excessive" noise by arrow 9.

Coupled to the output of amplifier 10 is a visual display monitor 12 and an analog-to-digital converter 14. Monitor 12 is typically an oscillograph. The gain of amplifier 10 is controlled by a gain-control network 11 which provides to the amplifier digital gain words. The gain-control network 11 includes a counter 16 and a comparator 17. Counter 16 provides to amplifier 10 on line 18 a digital word representing a gain setting. Counter 16 can be manually set through a line 20 which is fed by a manual early gain network 22. Comparator 17 compares the arriving digital data from the A-to-D converter 14 with a predetermined lower scale value and a higher scale value. The output of comparator 17 is also fed via a line 32 into counter 16. The amplifier 10, A-to-D converter 14, comparator 17 and counter 16 form a gain loop 19.

The count in counter 16 is compared by a comparator 34 with the setting provided by the early gain, manual network 22. The result of this comparison is fed via line 36 to a monitoring device 38 such as an oscilloscope, oscillograph, or a warning light.

In operation of the system of the present invention, the operator sets the early gain into counter 16 via line 20 by manipulating the manual control network 22. Counter 16 will then provide to amplifier 10 via line 18 the "guessed" early gain setting. The operation thereafter in accordance with this invention is automatically taken over by gain loop 19, and the operator needs no longer to continue to monitor each channel with monitor 12 unless and until the warning light 38 becomes actuated.

The scale limits in comparator 17 are set to predetermined fractions of the full scale of the A-to-D converter 14. For example, in one embodiment the lower scale limit was set to one sixty-fourth of the full scale and the upper scale limit to one-sixteenth of the full scale. When the digital signal received from the A-to-D converter 14 falls within the preselected scale limits, the gain of amplifier 10 ranges neither up nor down; when this signal falls below the lower scale limit, comparator 17 will provide an increase command signal via line 32, thereby causing counter 16 to count up and the gain of amplifier 10 to range up; when this signal is greater than the upper scale level, comparator 17 will provide a decrease command signal via line 32, thereby causing counter 16 to count down and the gain of amplifier 10 to range down.

In sum, an early gain count is preset into counter 16 by the manual control network 22 When normal noise 8 passes through the seismic amplifier 10, the input signal to comparator 17 will fall within the preselected scale limits and counter 16 will not change its preset count. If the noise level is less than normal noise 8, counter 16 will count up thereby causing the gain of amplifier 10 to range up. When excessive noise 9 passes through amplifier 10, counter 16 will count down from the preset count, thereby causing the gain of amplifier 10 to range down.

The actual count in counter 16 and hence the actual gain setting in amplifier 10 will be continuously compared by comparator 34 with the manual early gain setting in network 22, and the results of this comparison will be displayed on monitor 38. For many applications it is desired that a signal device such as a warning light indicate the presence of excessive noise 9 only. Thus, when counter 16 counts down in the presence of excessive noise 9, comparator 34 will provide a signal on line 36 which turns on the warning light 38. The operator then becomes alerted to the existence of an abnormality in the channel which could be excessive noise (manmade or natural), noisy detectors 4, or another abnormality. In any event, when the warning light 38 turns on, the operator will investigate the source of noise prior to giving the command signal which initiates the seismic detonations.

If the result of the operator's investigation reveals that no noise, or malfunction exists in the channel, then the operator will ascertain whether the manual early gain setting in network 22 is appropriate based on prior experience and other factors. If indicated, the setting of the manual gain will be lowered to turn the warning light 38 off.

While this invention has been described in connection with a seismic digital, binary-gain-ranging amplifier, it will be appreciated that amplifier 10 may be any seismic amplifier whose gain is varied in accordance with its output level. For example, in an analog channel the A-to-D converter 14 would not be required and the output of the comparator 17 could be directly applied to amplifier 10.

What is claimed is:

1. A system for monitoring the early gain of a seismic stepped-gain-ranging amplifier, said amplifier receiving a noise signal prior to receiving seismic signals from a plurality of detectors;

an A-to-D converter for converting the output from said amplifier to a digital signal;

a first comparator for comparing the output of said A-to-D converter with at least one predetermined level;

a gain-control network for receiving the output of said comparator and for providing to said amplifier a gain-control signal in dependence on the value of the output from said comparator;

a reference gain source; and a second comparator for comparing the gain of said reference source with the output of said gain-control network and for providing an indication of the noise level passing through said amplifier.

2. The system of claim 1 wherein, said first comparator compares the output of said A-to-D converter with a lower scale level and a higher scale level, said lower and higher scale levels being fractions of the full scale of said amplifier, and said first comparator providing a decrease digital gain word to said amplifier when the output of said A-to-D converter is greater than said higher scale level and an increase digital gain word when the output of said A-to-D converter is less than said lower scale level.

3. The system of claim 2 wherein, said gain-control network further includes a digital counter for providing to said amplifier said digital gain words.

4. The system of claim 3 wherein, the count in said counter is preset by said reference gain source, and said counter counts up or down in dependence on the output of said comparator.

5. The system of claim 4 wherein the output of said second comparator is applied to a gain monitor.

6. A stepped-gain-ranging amplifier system having means for automatically maintaining an early gain setting comprising:

a stepped-gain-ranging amplifier adapted to receive analog seismic signals and noise signals from a plurality of seismic detectors, said amplifier having a gain which is controllable by digital gain words;

an analog-to-digital converter coupled to the output of said amplifier for converting the analog output data from said amplifier into digital data;

a first comparator having lower and upper scale limits coupled to the output of said analog-to-digital converter for comparing the converted digital data with a predetermined scale in said comparator;

a counter having an early gain reference count preset therein, said counter counting the output of said comparator with respect to said reference count, said counter providing its output to said amplifier in the form of a digital word, whereby when the digital noise signal received from said converter falls below said lower scale limit, said amplifier will range up and, when said digital noise signal is greater than said upper scale limit, said amplifier will range down, thereby automatically maintaining an optimum early gain setting in said amplifier and further including: a second comparator for comparing said early gain reference count with an output from said counter, and an early gain monitor for monitoring the output of said second comparator.

* * * * *